US005973256A

United States Patent [19]

Martinez

[11] Patent Number: 5,973,256
[45] Date of Patent: Oct. 26, 1999

[54] FIVE KEY MUSIC GENERATOR

[76] Inventor: Gustavo A. Martinez, 4690 NW. 102 Ave. #201, Miami, Fla. 33178

[21] Appl. No.: 09/245,462

[22] Filed: Feb. 5, 1999

[51] Int. Cl.[6] .......... G10H 5/00; H04Q 1/18

[52] U.S. Cl. .......... 84/653; 84/670

[58] Field of Search .......... 84/600, 653, 670, 84/743

[56] References Cited

U.S. PATENT DOCUMENTS

| | | | |
|---|---|---|---|
| 5,166,462 | 11/1992 | Suzuki et al. | 84/600 |
| 5,313,010 | 5/1994 | Matsushima et al. | 84/600 |
| 5,373,096 | 12/1994 | Suzuki et al. | 84/600 |
| 5,430,240 | 7/1995 | Okamoto | 84/600 |
| 5,841,052 | 11/1998 | Stanton | 84/600 |

*Primary Examiner*—Jeffrey Donels
*Attorney, Agent, or Firm*—J. Sanchelima

[57] ABSTRACT

A portable and self-contained device for generating melodies. The electronics and battery are contained within an ergonometrically designed housing. Five switches assemblies are also housed therein with the switch actuators protruding out from the housing and being cooperatively positioned to permit a user to readily actuate them to generate one of up to 32 possible combinations that correspond to the musical notes of at least two octaves. A speaker is also housed inside the housing.

4 Claims, 2 Drawing Sheets

| K1 | K2 | K3 | K4 | K5 | Musical Note |
|---|---|---|---|---|---|
| 0 | 0 | 0 | 0 | 0 | - |
| 0 | 0 | 0 | 0 | 1 | - |
| 0 | 0 | 0 | 1 | 0 | c4 |
| 0 | 0 | 0 | 1 | 1 | c#4 |
| 0 | 0 | 1 | 0 | 0 | d4 |
| 0 | 0 | 1 | 0 | 1 | d#4 |
| 0 | 0 | 1 | 1 | 0 | e4 |
| 0 | 0 | 1 | 1 | 1 | f4 |
| 0 | 1 | 0 | 0 | 0 | f4 |
| 0 | 1 | 0 | 0 | 1 | f#4 |
| 0 | 1 | 0 | 1 | 0 | g4 |
| 0 | 1 | 0 | 1 | 1 | g#4 |
| 0 | 1 | 1 | 0 | 0 | a5 |
| 0 | 1 | 1 | 0 | 1 | a#5 |
| 0 | 1 | 1 | 1 | 0 | b5 |
| 0 | 1 | 1 | 1 | 1 | c5 |
| 1 | 0 | 0 | 0 | 0 | - |
| 1 | 0 | 0 | 0 | 1 | - |
| 1 | 0 | 0 | 1 | 0 | c5 |
| 1 | 0 | 0 | 1 | 1 | c#5 |
| 1 | 0 | 1 | 0 | 0 | d5 |
| 1 | 0 | 1 | 0 | 1 | d#5 |
| 1 | 0 | 1 | 1 | 0 | e5 |
| 1 | 0 | 1 | 1 | 1 | f5 |
| 1 | 1 | 0 | 0 | 0 | f5 |
| 1 | 1 | 0 | 0 | 1 | f#5 |
| 1 | 1 | 0 | 1 | 0 | g5 |
| 1 | 1 | 0 | 1 | 1 | g#5 |
| 1 | 1 | 1 | 0 | 0 | a6 |
| 1 | 1 | 1 | 0 | 1 | a#6 |
| 1 | 1 | 1 | 1 | 0 | b6 |
| 1 | 1 | 1 | 1 | 1 | c6 |

FIG. 2

FIVE KEY MUSIC GENERATOR

BACKGROUND OF THE INVENTION

1. Field of the Invention

The present invention relates to a music generator, and more particularly, to the type that is self-contained and portable.

2. Description of the Related Art

Many instruments and devices generate musical notes. Few are portable hand held and self-contained. The present invention permits a user to generate musical tones, separated by half tones, over at least two octaves with five keys. A user can readily convey a melody to others by merely manipulating the device with one hand. The present invention is volumetrically efficient and also provides an ergonometric shape.

SUMMARY OF THE INVENTION

It is one of the main objects of the present invention to provide a musical generator that permits a user to readily generate melodies for the purpose of entertainment or conveying to others these melodies for other purposes.

It is another object of this invention to provide a device that is battery operated and self-contained.

It is still another object of the present invention to provide a device that is ergonometrically designed to provide a comfortable grip.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 2 is a table showing the different possible combinations of the five switches to generate the different musical notes.

DETAILED DESCRIPTION OF THE PREFERRED EMBODIMENT

Figure 1:
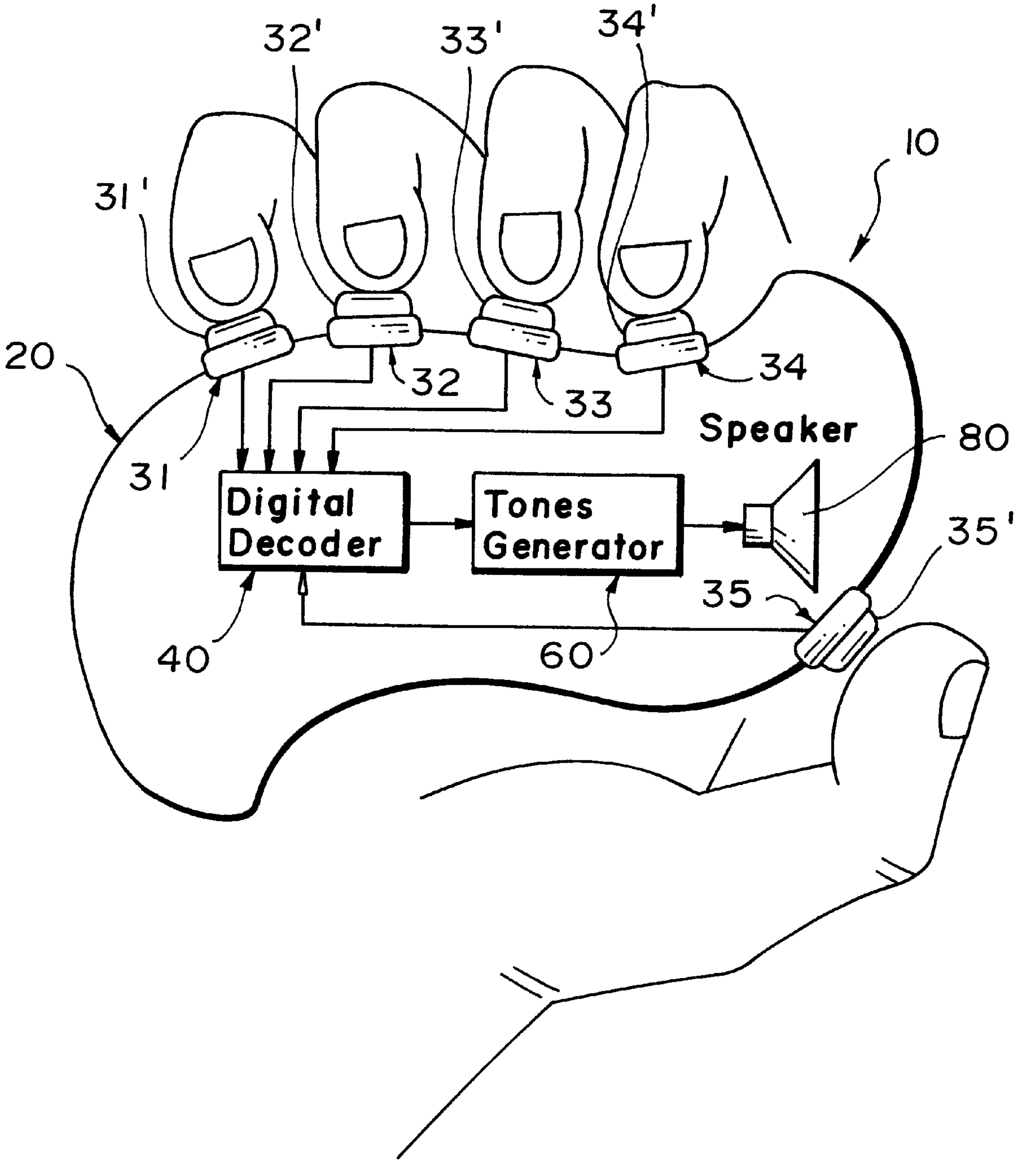
FIG. 1 represents a diagram of the circuit used in one of the preferred embodiments for the present invention with an ergonometric housing design shown.

Referring now to the drawings, and in particular to FIG. 1, where the present invention is generally referred to with numeral 10, it can be observed that it basically includes a housing 20 containing therein decoder circuit 40, tones generator circuitry 60 and speaker assembly 80. Five switch assemblies 31; 32; 33; 34 and 35 are connected to decoder circuit 40 and cooperatively partially protrude through housing 20 to permit a user to selectively activate them.

Housing 20 has an ergonometric design that provides for a comfortable grip that permits a user ready access to the different switch actuators 31'; 32'; 33'; 34' and 35' associated with their respective switch assemblies. Housing 20 has actuators 31' through 35' conveniently positioned to permit a user to use his five fingers.

Decoder circuit 40 can be implemented using TTL Logic Gates of any Programmable Logic Array (PLA). Tone generator 60 can be implemented with an integrated circuit, such as those manufactured by Philip Semiconductors, under part number PCD 3311.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A portable and self-contained device for generating melodies, comprising:

A) a housing having an ergonomic shape;

B) digital decoder circuit means contained within said housing and including five first input means and first output means;

C) five switches assemblies mounted to said housing and having each an actuator that is cooperatively positioned to permit a user to actuate them with his or her fingers, said five switches being electrically connected to said five input means of said digital decoder circuit means to generate up to 32 unique signal combinations on said first output means;

D) tone generator circuit means contained within said housing having second input means and second output means, said second input means being connected to said first output means, and said second output means generates a unique signal for each of said unique combinations, each of said unique signal corresponding to a musical note;

E) speaker means contained within said housing and said speaker means being connected to said second output means; and F) electrical battery means contained within said housing for powering said digital decoder circuit means and tone generator circuit means.

2. The device set forth in claim 1 wherein said musical tones are separated by musical half tones and extend over at least two octaves.

3. The device set forth in claim 2 wherein said actuator protrudes outwardly from said housing.

4. The device set forth in claim 2 wherein said tone generator circuit means generates 27 unique signals.

* * * * *